United States Patent [19]

Hokanson

[11] Patent Number: 4,765,048
[45] Date of Patent: Aug. 23, 1988

[54] VALVE STEM INSERTER

[76] Inventor: Blanchard M. Hokanson, 5413 Skylark Pass, Grand Blanc, Mich. 48439

[21] Appl. No.: 6,265

[22] Filed: Jan. 20, 1987

Related U.S. Application Data

[63] Continuation-in-part of Ser. No. 789,748, Oct. 21, 1985, abandoned.

[51] Int. Cl.$^4$ ............................................. B23P 19/04
[52] U.S. Cl. ...................................... 29/221.5; 29/235; 29/263
[58] Field of Search .................. 29/221.5, 235, 263

[56] References Cited

U.S. PATENT DOCUMENTS

| | | | |
|---|---|---|---|
| D. 224,916 | 10/1972 | Houston | D54/13 |
| 864,226 | 8/1907 | Blodgett | 29/235 |
| 2,050,005 | 8/1936 | Heegeman | 29/263 |
| 2,095,931 | 10/1937 | Kraft | 29/235 |
| 2,966,190 | 12/1960 | Nowotny | 152/370 |
| 2,990,736 | 7/1961 | Crandall | 81/15.7 |
| 3,387,354 | 6/1968 | Mossberg | 29/221.5 |
| 3,750,258 | 8/1973 | Sampo | 29/221.5 |
| 3,945,273 | 3/1976 | Welch | 81/15.7 |
| 4,009,624 | 3/1977 | Nishino | 81/15.7 |
| 4,341,382 | 7/1982 | Arnold | 273/65 |

Primary Examiner—Robert C. Watson
Attorney, Agent, or Firm—Gifford, Groh, VanOphem, Sheridan, Sprinkle and Dolgorukov

[57] ABSTRACT

A tool for inserting valve stems in the wheel rim of a tubeless tire and wheel combination comprises a tubular body having a tapered inner peripheral wall and an end portion adapted to be received in the stem hole of the wheel rim. The other end of the tubular body has a threaded aperture adapted to receive a threaded shaft therethrough. The shaft is adapted to engage the end of a valve stem and as it is rotated to drive it axially through the tubular body. As a result, the resilient, spaced apart ribs at the other end of the valve stem are axially compressed as they are driven through the stem hole in the wheel. Once the end most rib has protruded outwardly from the end of the tubular body, and expands on the inner side of the wheel rim wall, the tube is removed from the stem hole and the shaft is further rotated to extract the innermost rib from the end of the housing whereby the innermost rib expands on the opposite side of the wheel rim wall to thereby mount the valve stem to the wheel rim.

7 Claims, 1 Drawing Sheet

VALVE STEM INSERTER

This is a continuation-in-part of co-pending application Ser. No. 789,748 filed on Oct. 21, 1985, now abandoned.

BACKGROUND OF THE INVENTION

I. Field of the Invention

The present invention relates generally to tools for repairing vehicle tires, and more particularly to a tool for installing a valve stem in a wheel rim adapted to hold a tubeless tire.

II. Description of the Prior Art

Vehicle rims are often constructed to retain tubeless inflatable tires wherein the edges of the tire seal against the side wall of the rim and the hollow tire is inflated with air. Typically, a valve stem having a one way valve extends through a stem hole in the wheel rim so that one end of the stem is in fluid communication with the hollow chamber enclosed by the tire. The valve in the stem permits air to be introduced through the stem and into the tire chamber, but prevents air from escaping from the chamber through the valve stem. Quite often, the valve stem is provided with an end cap which treadably engages the exposed end of the stem to protect the valve mechanism therein.

The other end of the valve stem usually includes a pair of spaced apart, resilient ribs extending radially outwardly from the body of the stem. The resilient ribs sealingly engage the periphery of the stem hole on opposite sides of the wheel rim wall. The resilient ribs anchor the stem within the wheel rim and prevent leakage of air from the tire chamber around the valve stem. Of course, the resilient ribs are deformable so that the stem can be positioned within the stem hole.

Previously known tools are not well adapted for inserting the valve stem in a stem hole of the wheel rim. For example, use of a screwdriver blade to wedge portions of the ribs into the stem hole, a common way to mount valve stems, can often cut or otherwise damage the ribs and thus cause leakage of the seal around the stem hole. Moreover, insertion of the valve stem with such a tool can be difficult and time consuming in view of the resilience of the ribs and the fact that they tend to expand to a shape substantially larger than the stem hole.

Tools are also known such as disclosed in U.S. Pat. No. 3,387,354 which have a pusher rod advanced by action of a trigger handle on notches placed on the rod. The pusher rod advances a valve stem through a tapered spout to force the valve stem into the stem hole. However, tools of this type are relatively complex and expensive to manufacture and have a number of moving parts biased by springs which wear out after repeated use.

SUMMARY OF THE PRESENT INVENTION

The present invention overcomes the above mentioned disadvantages by providing a simple tool having a minimum number of parts which may be inexpensively manufactured. The tool has an elongaged tubular body and a threaded displacement shaft. The body has a longitudinal bore with a threaded cylindrical portion at one end and a conical portion which tapers radially inwardly towards an other end. The displacement shaft has a threaded surface for engagement of the threaded cylindrical portion of the bore, so that the shaft is axially movable within the bore when the shaft is rotated in order. The displacement shaft moves axially to direct the valve stem through the conical portion to concentrically compress the radial ribs of the valve stem and move the stem axially into the stem hole in the wheel rim. Preferably, the other end of the body has an end portion adapted to be received in the stem hole so that when the valve stem is axially displaced to a position where the end most rib protrudes outwardly from the body, the rib can expand and seal against the inner surface of the wall of the wheel rim. The tubular body is then removed from the stem hole so that the innermost rib radially expands and seals against the opposite side of the wheel rim well around the periphery of the stem hole.

The displacement shaft has a conical end portion adapted to engage the end of the valve stem and axially displace the stem axially along the bore and through the conical portion of the body when the shaft is rotated. The body has a hexagonally-shaped outer surface adapted for grasping by a human hand or a tool such as a wrench or the like for holding the body in position while the shaft is rotated. Additionally, the thread of the shaft is provided with a double lead to rapidly advance the shaft and stem through the body.

Thus, the present invention provides a tool for simply but efficiently installing valve stems in wheel rims for tubeless inflatable tires. Since the compressive forces exerted against the resilient ribs of the valve stem are concentrically and evenly applied, the tool substantially eliminates destruction of the valve stem ribs during installation. Moreover, the displacement shaft provides a mechanical advantage for displacing the valve stem through the tubular body as well as compressing the ribs as the stem is displaced through the tubular body.

It is an object of this invention to provide a valve stem inserting tool which is simple and inexpensive to manufacture.

It is a further object of the invention to provide a valve stem inserting tool which has few parts and which is not subject to breakdown and wearing out.

It is an object of the invention to provide a valve stem inserting tool which is easy to operate.

These and other advantages of the present invention will be better understood with reference to the following detailed description.

BRIEF DESCRIPTION OF THE DRAWING

The present invention will be more clearly understood by reference to the following detailed description of a preferred embodiment when read in conjunction with the accompanying drawing in which like reference characters refer to like parts throughout the views and in which:

FIG. 4 is a partial section view of the preferred embodiment of the tool according to the present invention.

DETAILED DESCRIPTION OF A PREFERRED EMBODIMENT OF THE PRESENT INVENTION

Figure 1:
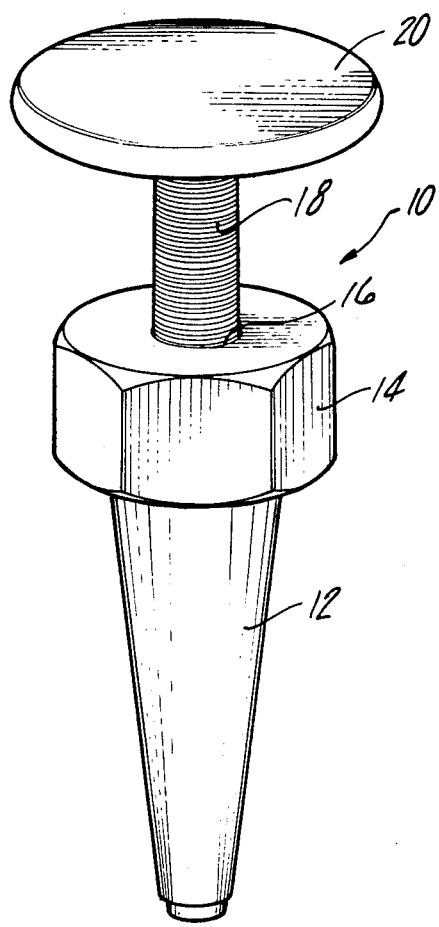
FIG. 1 is a perspective view of an alternative embodiment of a tool according to the present invention.

As shown in FIG. 4, a preferred embodiment of the tool 110 for the insertion of a valve stem 30 into a stem hole of a wheel rim of the present invention includes an elongated tubular body 112, and a displacement shaft 114 threadably received within in an axial bore 118 of the body 112. The body may be formed of any suitable material such as metal, plastic, or composite material which is suitably rigid. An other end 119 of the tubular body has a conically-shaped outer surface 120. The conically-shaped outer surface 120 tapers radially inwardly towards the other end the tubular body has a hexigonal cross section in order to facilitate a grasping of the tubular body either by hand or by implement, such as a wrench, in order to hold the body in position against rotation.

A reduced diameter end portion 122 is adapted to be received within the stem hole of a conventional wheel rim wall extends from the conically-shaped outer surface. An annular portion 124 extends between the reduced diameter end portion 122 and the conically-shaped surface for abutment against a surface of the wheel rim wall when the tubular body is inserted within the stem hole.

The bore 118 is formed by an inner wall surface extending axially from one end of the tubular body to the other end. Extending along the inner wall surface inwardly from one end of the tubular body is a cylindrical threaded surface 126 having an inner diameter dimensioned to freely receive the valve stem 30 therein. As will be explained below, the threaded surface may be cut with a double lead thread to receive the shaft 114. A smooth conical surface 128 extends from the threaded cylindrical surface 126 towards the other end of the tubular body. The conical surface tapers radially inwardly as it extends to the other end 119.

Figure 3:
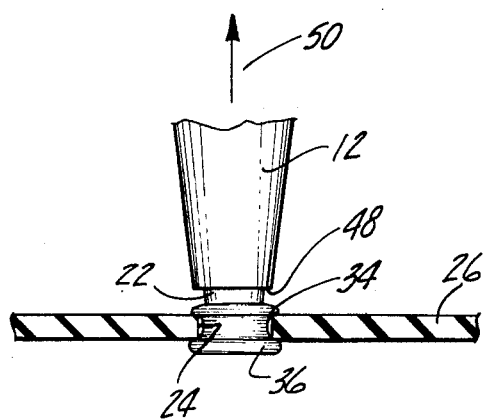
FIG. 3 is a fragmentary front view showing the valve stem positioned by the tool according to the present invention.

The valve stem 30 comprises an elongated stem body 32, one end of which includes a pair of spaced apart ribs 34 and 36, respectively. Each of the ribs 34 and 36 normally have a diameter larger than the diameter of the stem hole 24 for sealing engagement therewith as shown in FIG. 3. The other end of the stem body 32 includes a threaded portion adapted to be received within an end cap 38.

The displacement shaft 114 is formed of any suitable rigid material such as metal, plastic or composite and has a threaded portion 130 in which threads are cut to be received within the threaded surface 126 of the body. The threaded portion 130 may be provided with double lead threads in order to increase the speed of advance of the displacement shaft through the bore. Extending axially from the threaded portion 130 into the bore towards the other end 119 is a conical portion 132 tapering radially inwardly toward one end 134 of the shaft. The conical portion 132 of the shaft is adapted to be received within the conical surface 126 of the body when the shaft is advanced to displace the vlave stem along the bore towards the other end 119. The end 134 of the shaft is provided with a concave recess 136 adapted to receive the top of the stem cap 38. The recess 136 prevents the stem 30 from cocking or otherwise becoming displaced in a direction other than axially as it it advanced through the bore. Extending from the threaded portion 130 in a direction away from the conical portion 132 is a rod portion 138 having a handle portion 140 extending normally to the rod portion for facilitating rotation of the shaft. The shaft may be adapted to be rotated by other mechanisms such as pneumatic motors.

The tool is operated by first placing the valve stem 30 into the bore with the ribs 34 and 36 aligned in the direction of the other end 119. The displacement shaft 114 is then placed into the bore and rotated in order that the threaded portion 130 of the shaft engages the threaded cylindrical surface of the body to advance the shaft axially in the direction of the other end 119 of the body. The shaft 114 is advanced until the end 134 of the shaft engages the end cap 138. The tubular body 112 is then inserted within the stem hole 24 of the wheel rim 26 in the manner shown for the alternative embodiment in FIG. 2. The shaft 114 is then rotated to advance the valve stem from axially along the conically tapered surface 126 until the valve stem extends out the other end of the tubular body into the stem hole 24 of the wheel rim as shown in FIG. 3. The threaded cylindrical surface 124 of the body and rod portion of the shaft are sufficienntly long enough to permit advancement of the valve stem fully through the conical tapered surface to extend into the stem hole 24. Thus, the body 112 may be extracted from the stem hole 24 by pulling in a direction of the arrow 50 as shown in FIG. 3, and the shaft may be further rotated to insure that the extraction force does not tend to pull the rib 36 of the valve stem upwardly through the stem hole 24. The shaft may be then rotated in an opposite direction to remove it from within the bore of the body and to permit reuse of the tool.

Figure 2:
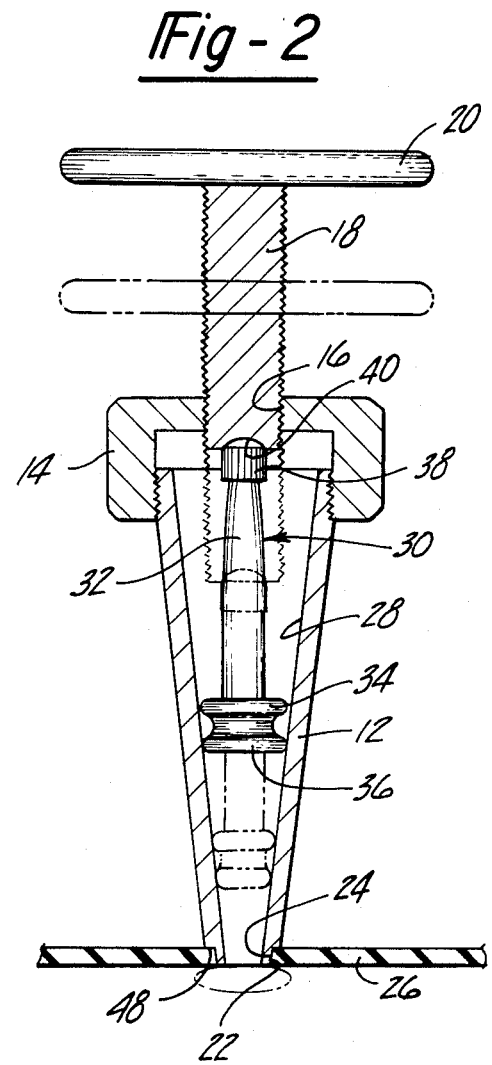
FIG. 2 is a sectional view of the alternative embodiment tool shown in FIG. 1.

An alternative embodiment of the invention is shown in FIG. 1 where a tool 10 is shown having a tapered elongated tubular body 12 having a length longer than the valve stem 30 as shown in FIG. 2. An upper end of the body has a threaded protion for receiving an end cap 14. The end cap 14 includes a threaded aperture 16 adapted to threadably engage a threaded rod 18 so that the rod may extend into the interior of the tubular body 12. An outer end of the shaft 18 has a radially enlarged head 20 which may be grasped easily for manual rotation of the rod 18 within the threaded aperture 16.

As best shown in FIG. 2, the other end of the tubular body has a reduced diameter end portion 22 adapted to be received within the stem hole 24 of a wheel rim wall 26. An inner peripheral wall 28 of the tubular body defines a tapered bore through the tubular body. An upper end of the tubular bore is dimensioned to freely receive the valve stem 30 therein.

The inner end of the rod 18 has a concave recess 40 adapted to receive the top of the stem clamp 38. The tool is used in a similar manner as described for the preferred embodiment above. A valve stem 30 is introduced into the body and the rod is advanced through the threaded aperture 16 by rotation until the recess 40 of the rod engages the end cap 38 of the valve stem. As described above, the rod is rotated within the end cap 14 to advance the valve stem through the tubular body and drive valve stem through the other end of the tube until it is in position within the stem hole of the wheel rim.

Although the valve stem 30 has been illustrated as being a particular configuration, valve stems of other configurations are accompanying this. They are, however, all characterized by the provisions of an end portion which compresses to pass through the valve stem hole and then expands to mount the valve stem to the rim. The tool of the present invention can be used to mount valve stems other than the one illustrated in the present invention. Thus, the present invention provides a tool for quickly installing a valve stem in a wheel rim adapted to retain a tubeless tire. Moreover, the tool avoids the damaging forces to the sealing ribs of the valve stem during installation. The tool of the present invention substantially reduces the time and effort necessary to install the valve stems for tubeless tires.

Having thus described the present invention, many modifications of the tool will become apparent to those skilled in the art which pertains without departing from the spirit of the present invention as defined in the appended claim.

What is claimed is:

1. A tool for installing a valve stem in a stemhole of a wheel rim, said valve stem having a compressible end portion to sealingly engage said wheel rim, said tool comprising:

an elongated body having an outer surface and an inner surface extending between a pair of ends, said inner surface defining a longitudinal bore, said inner surface having a threaded portion extending from one end of said pair of ends, said threaded portion having a diameter greater than a diameter of said valve stem to freely accept said valve stem within said threaded portion, and a conical portion, said conical portion tapering radially inwardly from said threaded portion towards an other of said pair of ends;

a displacement shaft having a threaded surface for engaging said threaded portion of said inner surface for axial movement of said shaft when said shaft is rotated, said threaded surface having a diameter greater than said diameter of said valve stem, and shaft having end portion adapted to engage said valve stem and displace said valve stem through said conical portion of said inner surface when said shaft moves towards said one end of said tubular body, whereby said valve stem being resiliently compressed as said stem is displaced through said conical portion to a size for insertion into said stem hole; and means for rotating said displacement shaft for reciprocal movement in said bore.

2. The tool as defined in claim 1 wherein said outer surface of said elongated body further comprises a hexagonal shaped portion.

3. The tool as defined in claim 1 wherein said one end of said pair of ends further comprises an inset portion having a predetermined diameter adapted to be received in said stem hole.

4. The tool as claimed in claim 3 wherein said one end of said pair of ends further comprises an annular surface extending outwardly from said inset portion for abutment with said wheel rim when said one end is inserted in said stem hole.

5. The tool as defined in claim 1 wherein said end portion of said displacement shaft has a conical shape adapted to be received by said conical portion of said tubular body when said displacement shaft is moved towards said one end of said tubular body.

6. The tool as claimed in claim 1, wherein said threaded portion of said tubular body and said threaded surface of said shaft further comprise a double lead thread for rapid advancement of said displacement shaft.

7. The tool as claimed in claim 1, wherein said threaded portion of said tubular body has an axial length greater than the length of said conical portion of said tubular body.

* * * * *